United States Patent
Sadasivam et al.

(10) Patent No.: US 9,646,205 B2
(45) Date of Patent: May 9, 2017

(54) SYSTEM AND A METHOD FOR FACILITATING TESTING OF PLURALITY OF DEVICES USING A DRONE

(71) Applicant: HCL Technologies Ltd., Noida (IN)

(72) Inventors: Siva Sakthivel Sadasivam, Chennai (IN); Murali Krishnaan G, Chennai (IN); Vishal Chaudhary, Chennai (IN)

(73) Assignee: HCL Technologies, Ltd., Noida (IN)

( * ) Notice: Subject to any disclaimer, the term of this patent is extended or adjusted under 35 U.S.C. 154(b) by 8 days.

(21) Appl. No.: 14/830,987

(22) Filed: Aug. 20, 2015

(65) Prior Publication Data

US 2016/0350593 A1 Dec. 1, 2016

(30) Foreign Application Priority Data

May 26, 2015 (IN) .......................... 1509/DEL/2015

(51) Int. Cl.

| G01C 23/00 | (2006.01) |
|---|---|
| G05D 1/00 | (2006.01) |
| G05D 3/00 | (2006.01) |
| G06F 7/00 | (2006.01) |
| G06F 17/00 | (2006.01) |
| G06K 9/00 | (2006.01) |
| B64C 39/02 | (2006.01) |

(52) U.S. Cl.
CPC ........ G06K 9/00536 (2013.01); B64C 39/024 (2013.01); *B64C 2201/042* (2013.01); *B64C 2201/06* (2013.01); *B64C 2201/123* (2013.01); *B64C 2201/126* (2013.01); *B64C 2201/148* (2013.01)

(58) Field of Classification Search
CPC .............. G06K 9/00536; B64C 39/024; B64C 2201/123; B64C 2201/126; B64C 2201/148; B64C 2201/06; B64C 2201/042
USPC ......................................................... 701/1, 3
See application file for complete search history.

(56) References Cited

U.S. PATENT DOCUMENTS

2016/0232794 A1* 8/2016 Hafeez ................. G08G 5/0034
2016/0271796 A1* 9/2016 Babu ........................ B25J 9/163

FOREIGN PATENT DOCUMENTS

| CN | 102843863 A | 12/2012 |
|---|---|---|
| CN | 103235830 A | 8/2013 |

* cited by examiner

*Primary Examiner* — Jaime Figueroa
(74) *Attorney, Agent, or Firm* — Shumaker, Loop & Kendrick, LLP (57) ABSTRACT

Disclosed is a system and method for facilitating testing of a plurality of devices using a drone. At first, a locating module locates position of the drone relative to the plurality of devices. Further, a receiving module receives an image, of a device of the plurality of devices, from image capturing unit of the drone. Then, a comparing module compares the image with a reference image corresponding to the device. Based on the comparison, a determining module determines an action to be performed for testing the device. Further, a facilitating module facilitates the testing by enabling a snout associated with the drone to perform the action on the device.

9 Claims, 8 Drawing Sheets

SYSTEM AND A METHOD FOR FACILITATING TESTING OF PLURALITY OF DEVICES USING A DRONE

CROSS-REFERENCE TO RELATED APPLICATIONS AND PRIORITY

The present application claims priority from Indian Patent Application No. 1509/DEL/2015 filed on May 26, 2015.

TECHNICAL FIELD

The present subject matter described herein, in general, relates to a system and method for testing plurality of devices using a drone.

BACKGROUND

In a production environment, different types of devices are continuously produced and manufactured. These devices generally belong to a device under test (DUT) category. These devices are required to be tested before entering the market. The purpose of performing the test(s) is to ensure that the devices are working well and are free from any defect. The test(s) also prevents damaged devices from entering into the market.

The testing may be performed manually or automatically. In manual testing, chances for human errors are high. Also, human involvement takes lot of time and energy in performing the test. To overcome the manual testing, automatic testing is done. Generally, robots are used for performing the automatic testing of the devices. The automatic robots are programmed to use their hands and arms to test the devices. However, the robotic arms have limited axis of freedom. Their functioning is limited with pre-programmed instructions. Moreover, robotic arms have fixed length, which restricts them when reaching for the next device in a queue of devices. Further, robotic arms are also restricted to test only limited number of devices depending up on its size and shape.

SUMMARY

This summary is provided to introduce aspects related to a system and method for facilitating testing of a plurality of devices using a drone are further described below in the detailed description. This summary is not intended to limit the scope of the disclosed subject matter.

In one implementation, a system for facilitating testing of a plurality of devices using a drone is disclosed. The system may include a processor and a memory coupled to the processor. The processor may execute a set of instructions stored in the memory to locate a position of the drone relative to the plurality of devices placed in a testing environment. The drone may be capable of moving around the plurality of devices. Further, the processor may execute the set of instructions to receive an image of at least one device of the plurality of devices. The image may be received from an image capturing unit of the drone. The processor may further execute the set of instructions to compare the image with a reference image corresponding to the at least one device of the plurality of devices. Further, the processor may execute the set of instructions to determine an action to be performed for testing the at least one device based on the comparison. The processor may further execute the set of instructions to facilitate the testing by enabling a snout associated with the drone to perform the action on the at least one device.

In another implementation, a method for facilitating testing of a plurality of devices using a drone is disclosed. The method may include locating, by a processor, a position of the drone relative to the plurality of devices placed in a testing environment. The drone may be capable of moving around the plurality of devices. Further, the method may include a step of receiving, by the processor, an image of at least one device of the plurality of devices. The image may be received from an image capturing unit of the drone. The method may further include a step of comparing, by the processor, the image with a reference image corresponding to the at least one device of the plurality of devices. Further, the method may include a step of determining, by the processor, an action to be performed for testing the at least one device based on the comparison. The method may further include a step of facilitating the testing by enabling a snout associated with the drone to perform the action on the at least one device.

In yet another implementation, a non-transitory computer readable medium embodying a program executable in a computing device for facilitating testing of a plurality of devices using a drone is disclosed. The program may include a program code for locating a position of the drone relative to the plurality of devices placed in a testing environment. The drone may be capable of moving around the plurality of devices. The program may further include a program code for receiving an image of at least one device of the plurality of devices. The image may be received from an image capturing unit of the drone. The program may further include a program code for comparing the image with a reference image corresponding to the at least one device of the plurality of devices. Further, the program code may include a program code for determining an action to be performed for testing the at least one device based on the comparison. The program may further include a program code for facilitating the testing by enabling a snout associated with the drone to perform the action on the at least one device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present systems and methods will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
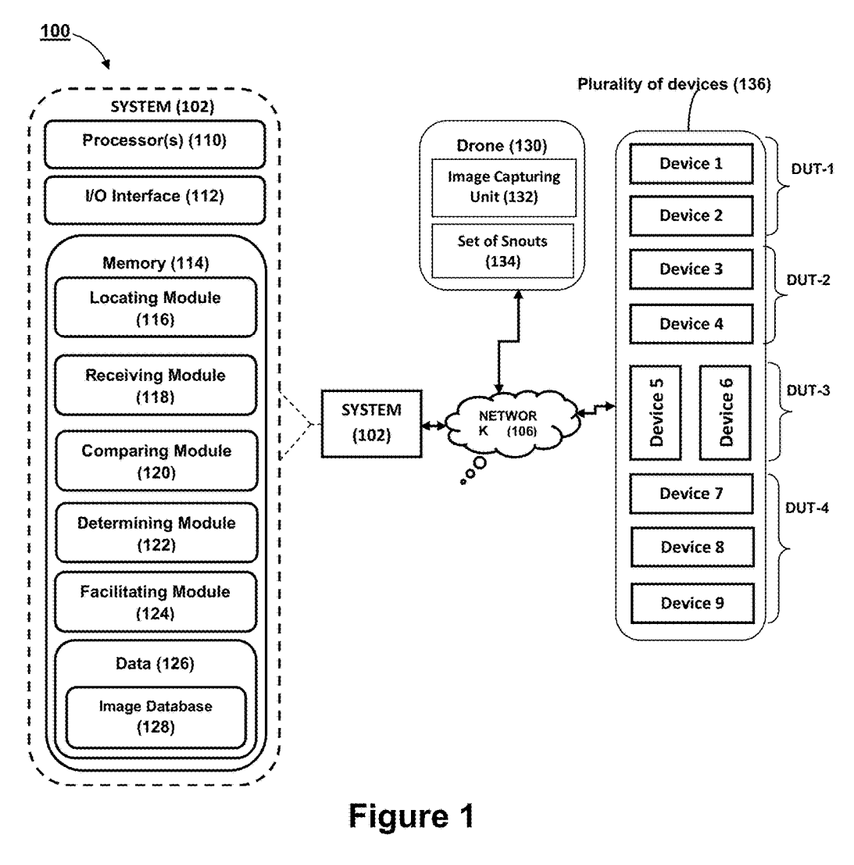
FIG. 1 illustrates a network implementation illustrating communication between a system and a drone for facilitating testing of a plurality of devices, in accordance with an embodiment of the present disclosure.

Referring to FIG. 1, a network implementation 100 of a system 102 and a drone 130 for facilitating testing of a plurality of devices 136 is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. Further, the drone 130 may comprise an image capturing unit 132 and a set of snouts 134. According to embodiments of present disclosure, the system 102 may be communicatively coupled to the drone 130 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The system 102 illustrated in the FIG. 1 may further comprise a processor 110, an input/output (I/O) interface 112, and a memory 114 comprising plurality of modules, and data 126. The processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions or modules stored in the memory 114.

The I/O interface 112 may include a variety of software and hardware interfaces, for example, a web interface, a graphical user interface, and the like. The I/O interface 112 may allow the system 102 to interact with the drone 130. Further, the I/O interface 112 may enable the system 102 to communicate with other computing devices, such as web servers and external data servers (not shown). The I/O interface 112 can facilitate multiple communications within a wide variety of networks and protocol types, including wired networks, for example, LAN, cable, etc., and wireless networks, such as WLAN, cellular, or satellite. The I/O interface 112 may include one or more ports for connecting a number of devices to one another or to another server.

The memory 114 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 114 may include modules which may perform particular tasks or implement particular abstract data types.

The modules include routines, programs, objects, components, data structures, etc., which perform particular tasks or implement particular abstract data types. In one implementation, the modules may include a locating module 116, a receiving module 118, a comparing module 120, a determining module 122, and a facilitating module 124. Further, the data 126 comprises an image database 128.

Figure 2A:
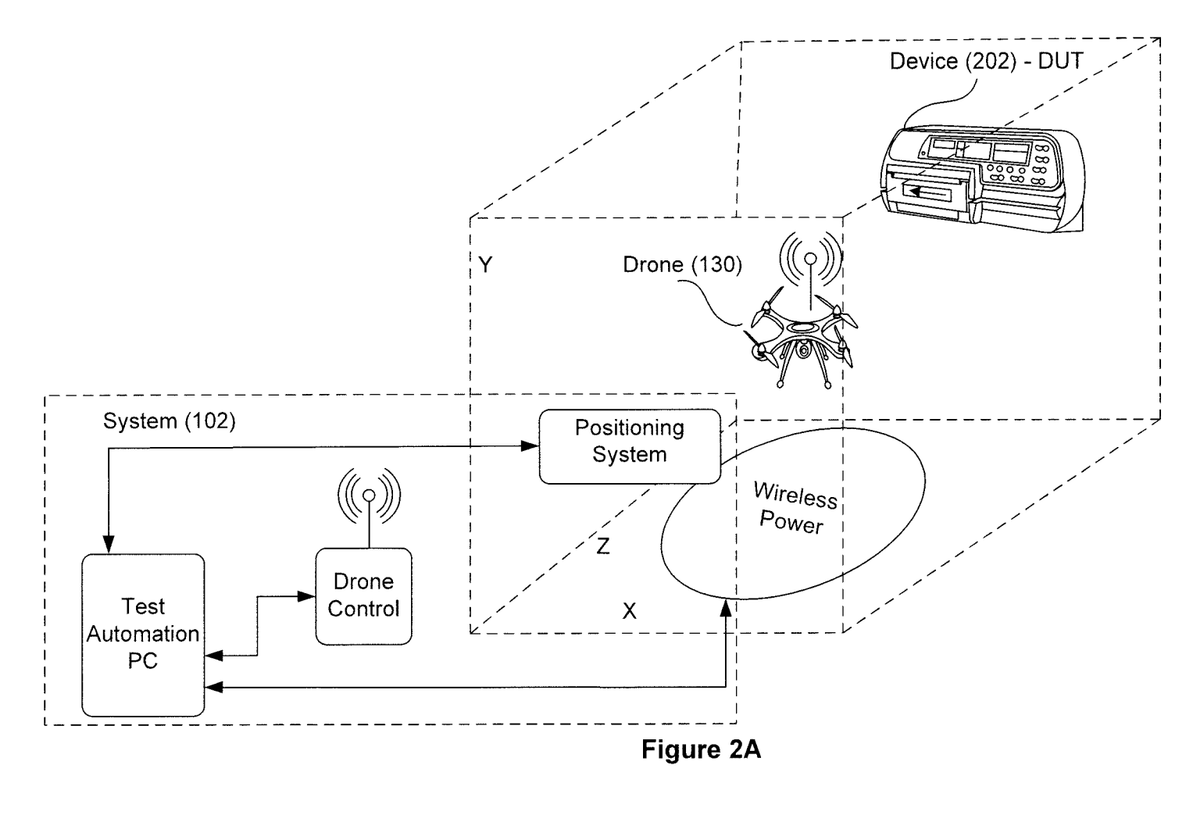
FIGS. 2A, 2B, 2C, 2D, 2E, and 2F illustrate exemplary detailed workings of the system and the drone, in accordance with an embodiment of the present disclosure.
Figure 2B:
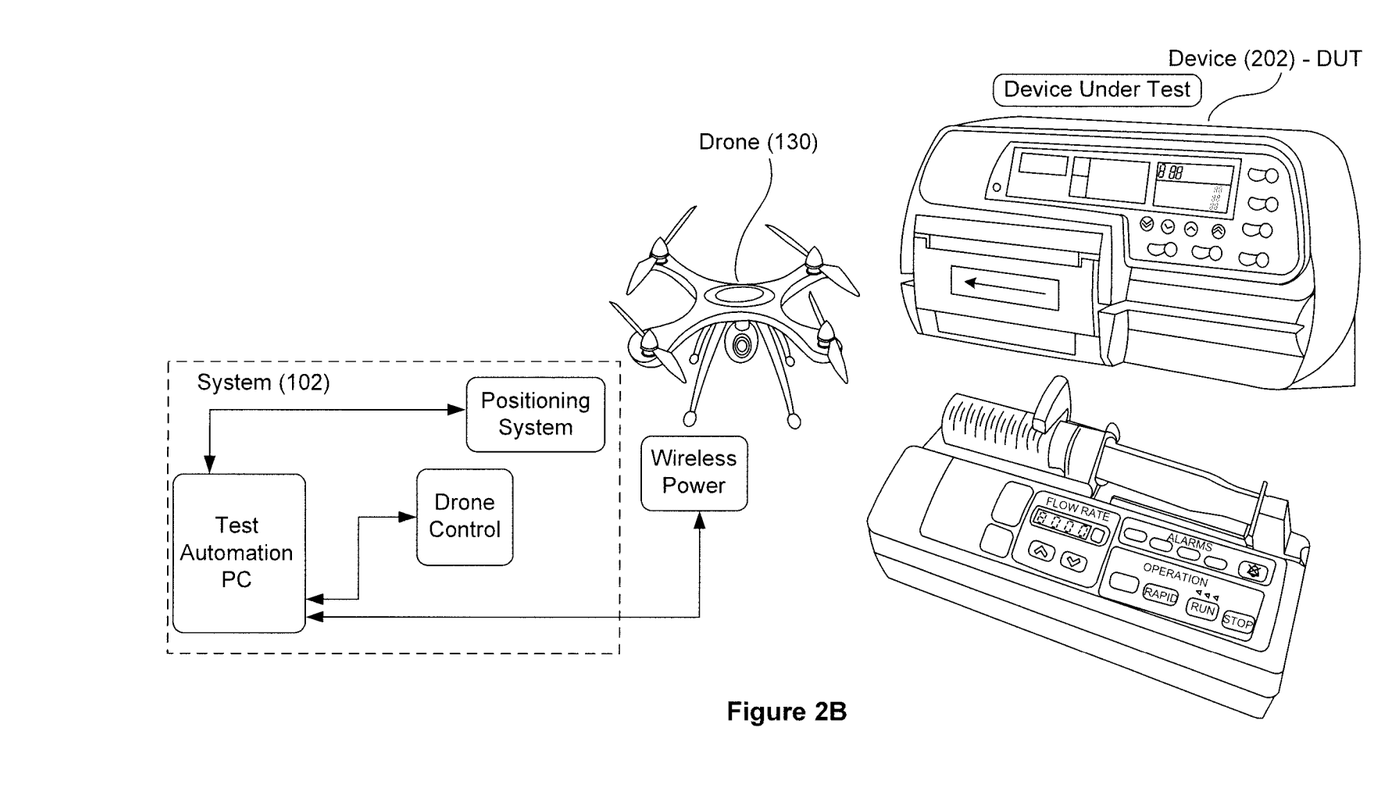
Figure 2C:
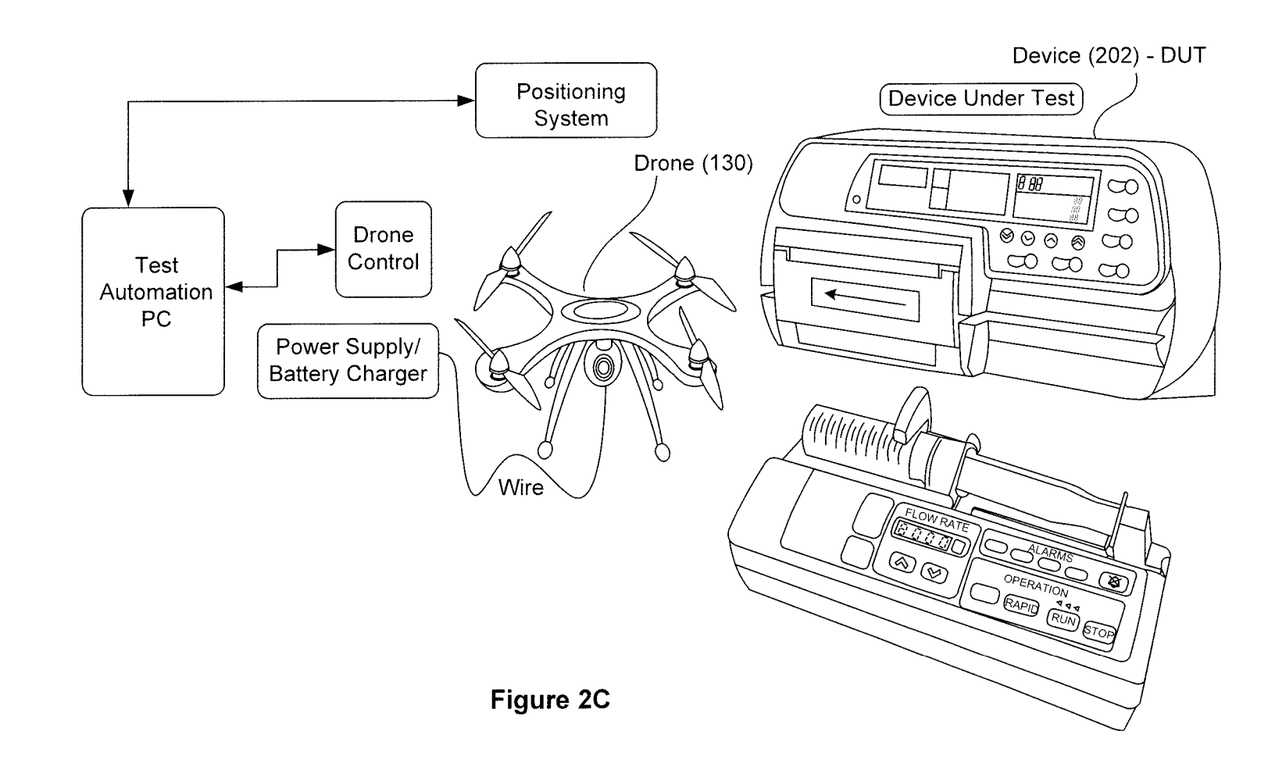
Figure 2D:
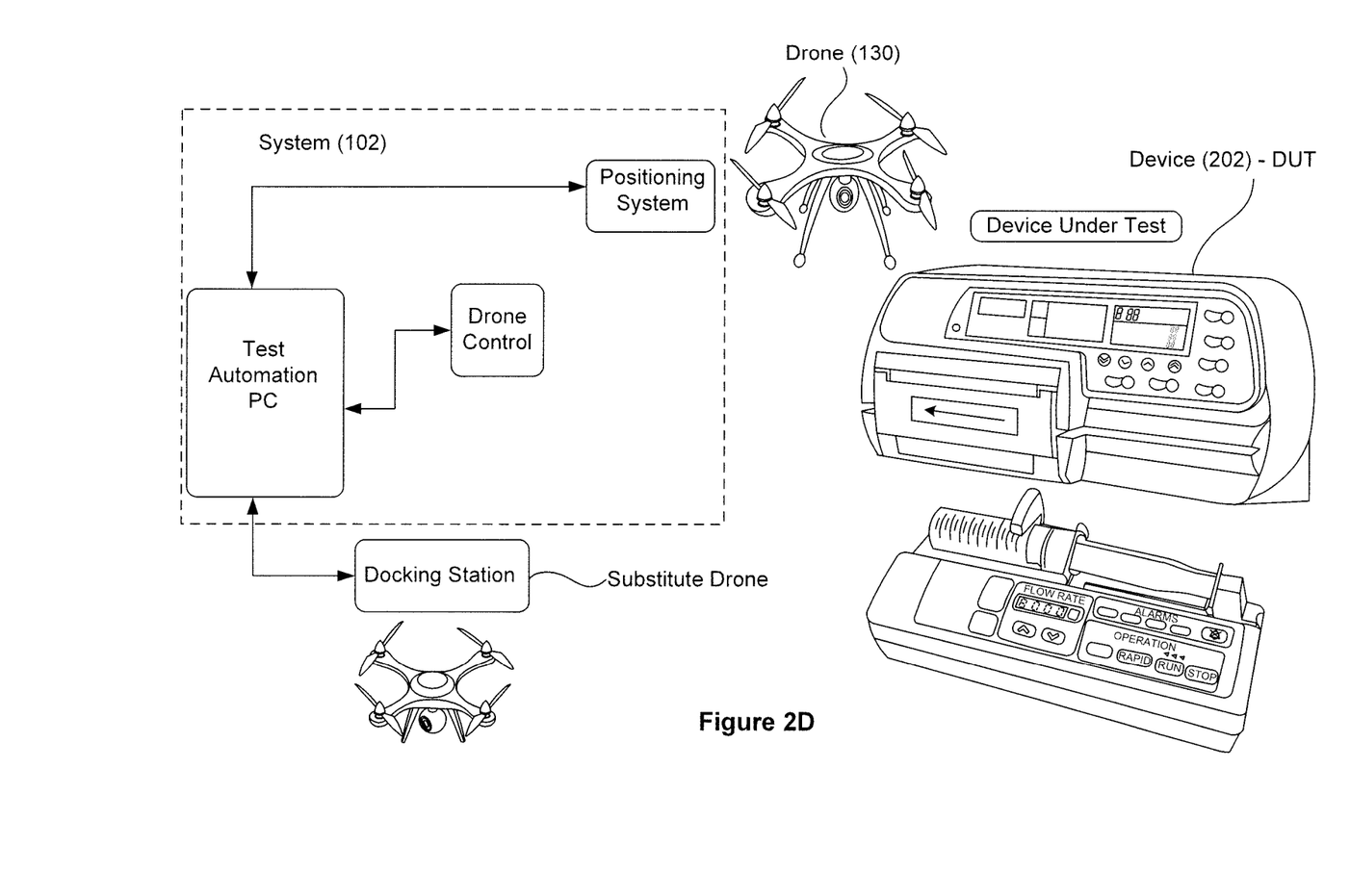
Figure 2E:
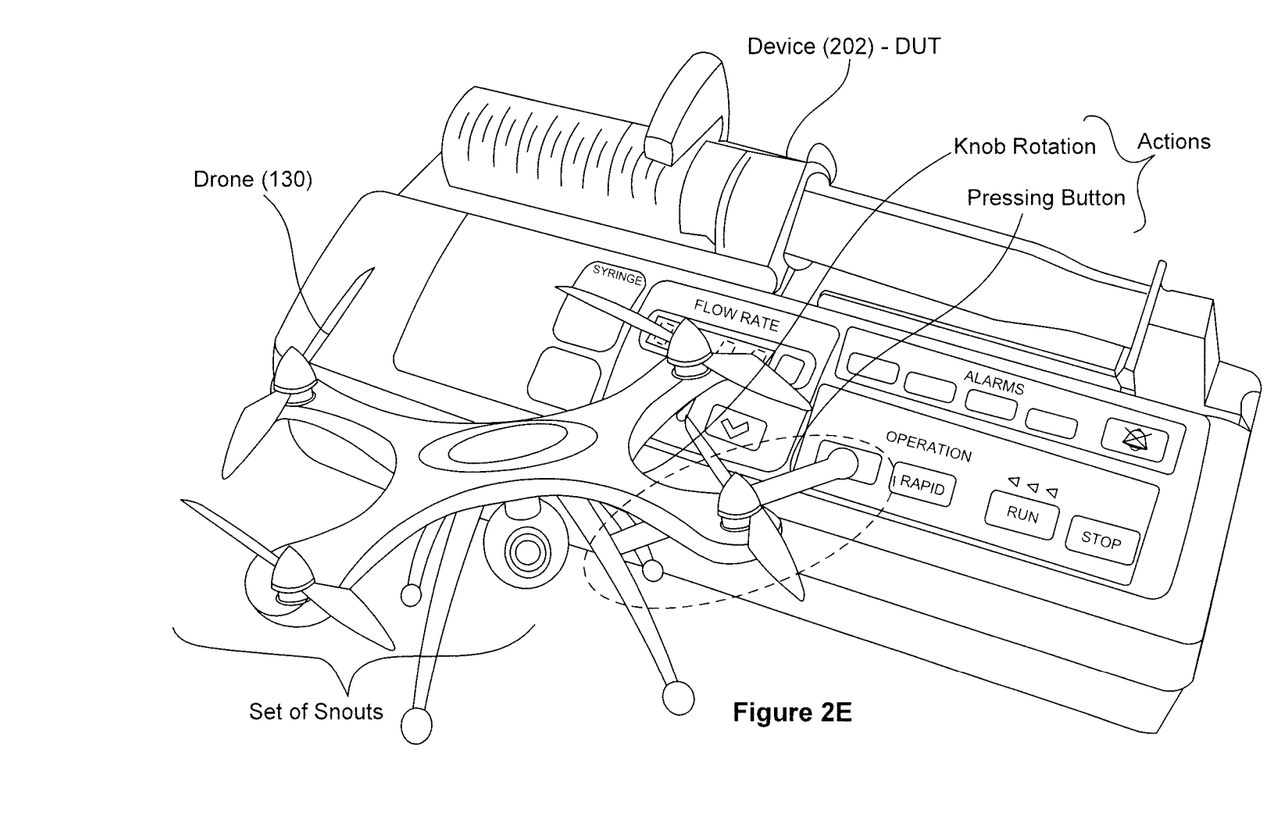
Figure 2F:
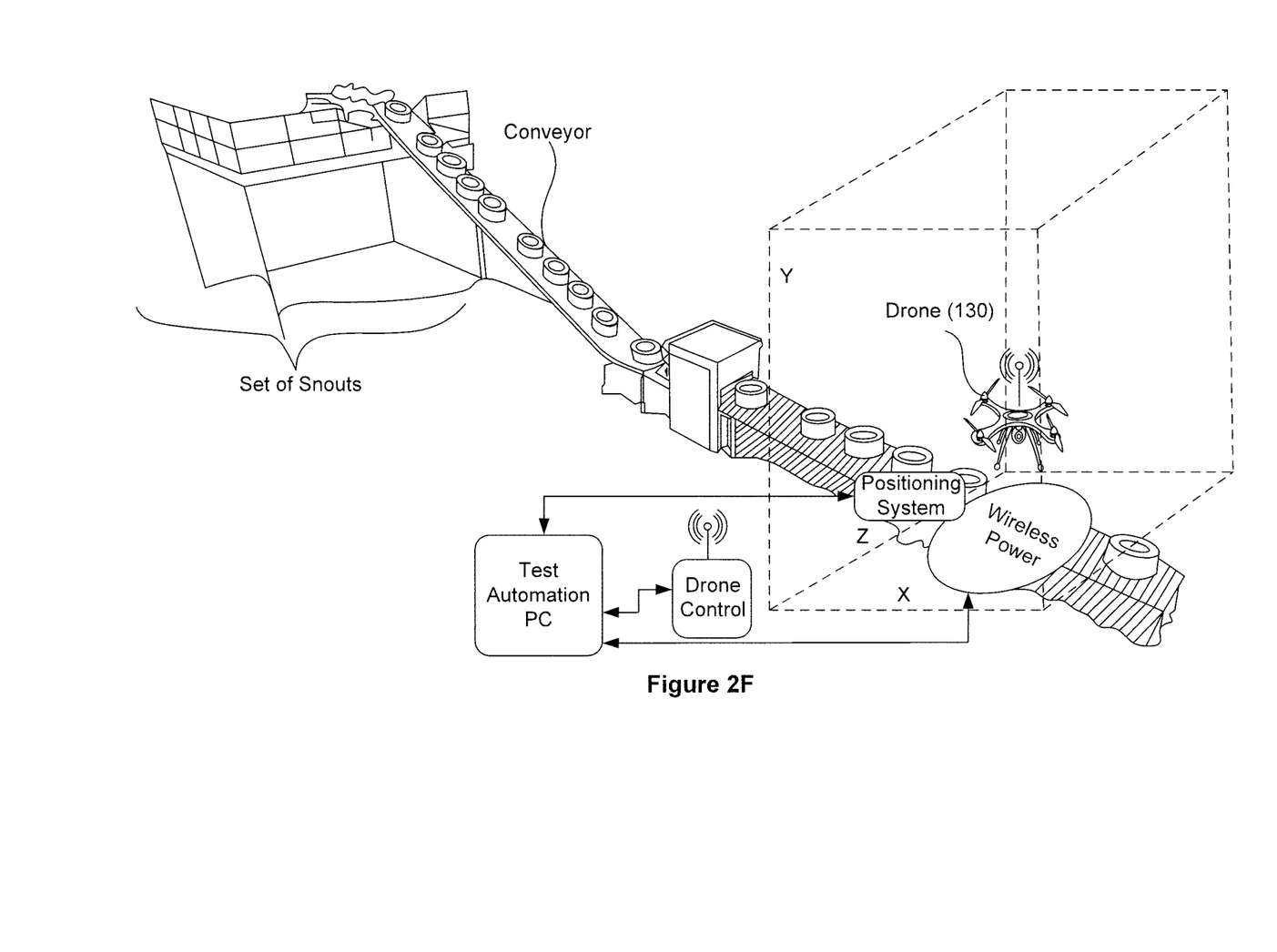

Now referring to FIGS. 2A-2F, FIGS. 2A-2F illustrate detailed exemplary workings of the system 102 and the drone 130, in accordance with embodiments of present disclosure. The system 102 controls the functioning of the drone 130 while testing plurality of devices 136 (FIG. 1) in a production environment. In the production environment, the plurality of devices 136 belongs to device under test (DUT) category. As conventionally known, that the devices under this category are tested before it enters into a market. While testing, a lot of necessary actions are required to be performed to check the health of the plurality of devices 136. The plurality of devices 136 may be arranged, but not limited to, in a stack type arrangement (FIG. 1) or may arrive in a conveyor-type system (FIG. 2F).

In the present disclosure, the system 102 utilizes the drone 130 for testing the plurality of devices 136. Using of the drone 130 not only brings automation in the testing but also facilitates flexibility in such kind of testing environment. The aerial movement of the drone 130 enables it to move around the plurality of device 136 in different positions. Also, the different arrangement in which the plurality of devices 136 is placed does not restrict the drone 130 in performing the testing due to its aerial movement.

At first, the locating module 116, of system 102, locates the position of the drone 130 relative to the plurality of devices 136 to be tested. In one embodiment, the locating module 116 may also be implemented as a positioning system, as shown in FIG. 2A. The locating module 116 determines coordinates of the location of the drone 130. Further, the locating module 116 may use different methods for locating the position of the drone 130. The different methods may comprise infra-red (IR) based sensing, ultrasound based sensing, radio-frequency (RF) based positions, geo-positioning system (GPS), and Xbox Kinect.

Further, the drone 130 may comprise an image capturing unit 132 and a set of snouts 134. When the testing of the plurality of devices 136 is initiated, the drone 130 may capture an image of a display/screen/monitor/panel of a particular device 202, of the plurality of devices 136, using the image capturing unit 132. After capturing the image, the drone may transmit the image to the system 102. The receiving module 118, of the system 102, may receive the image transmitted by the drone 130. The image received may comprise certain information associated with that particular device 202. For example, the information may comprise different values or readings associated with a control function of the device 202. The values or the readings of the control functions may depend upon type or nature of the device 202. In one example, the value or the reading of the control function "flow rate" may be read as "450" for that particular device 202. In one embodiment, the drone 130 may capture an image of the entire device and send the image to the system 102 for analysis.

At one hand, as the system 102 receives the image of the display of the device 202, the system 102 also has a set of reference images, pre-stored in system's database, of the display of each of the plurality of devices 136. The reference images may comprise standard values or readings of the control functions associated with the plurality of devices 136. Thus, after receiving the image of the display of the device 202, the comparing module 120, of the system 102, may compare the image (received) with the reference image of the display of that device 202. The comparison may result in identifying any discrepancies or variation of current readings/values (of the image received) from the standard readings/values (of the reference image). Any such discrepancies may lead to failure or breakdown of the device 202. Hence, it is important to identify such discrepancies in the device 202, and then, take an appropriate action to overcome the discrepancies. For example, the current reading/value for the control function "flow rate" may be read to be "450". Whereas, while comparing the image, it is found that standard reading/value of the control function "flow rate" is "500". Thus, the appropriate action may be required to be determined and implemented for correcting this discrepancy.

The appropriate action or "action" may be determined by the determining module 122 of the system 102 based on the above comparison. The action determined may be performed or implemented for testing the device 202. Further, the facilitating module 124, of the system 102, may facilitate the testing by enabling one or more snouts of the set of snouts 134, of the drone 130, to perform the action on the device 202. It can be seen from FIG. 2E that the snouts, of the drone 130, performing the actions on the device 202. The actions may comprise, but not limited to, touch, click, swipe, knob rotation, hard key press, and pressing buttons. Some of the actions, for example, the knob rotation and pressing button are clearly shown in the FIG. 2E. Further, the test activities performed may also be recorded for future references.

According to embodiments of present disclosure, the system 102 may provide power continuously to the drone 130, as shown in FIGS. 2B and 2C. General, the drones are able to fly for around 30 minutes with a single charge. But for continuous testing, the power is required to be delivered continuously to the drones. So for continuous power, the technologies like a wireless charging (FIG. 2B) and wired i.e., battery or power supply (FIG. 2C) may be used for charging the drone 130.

According to another embodiment of the present disclosure, the system 102 may have a substitute drone, instead of powering the drone 130 continuously, as shown in FIG. 2D. In this embodiment, two drones may be used at any point of time. One drone may be in a charging dock and the other drone 130 may be in operating condition. When battery of the operating drone 130 becomes low, the system 102 may provide a command to place the operating drone 130 in another charging dock and another command to the charging drone/substitute drone to get into the operation.

Figure 3:
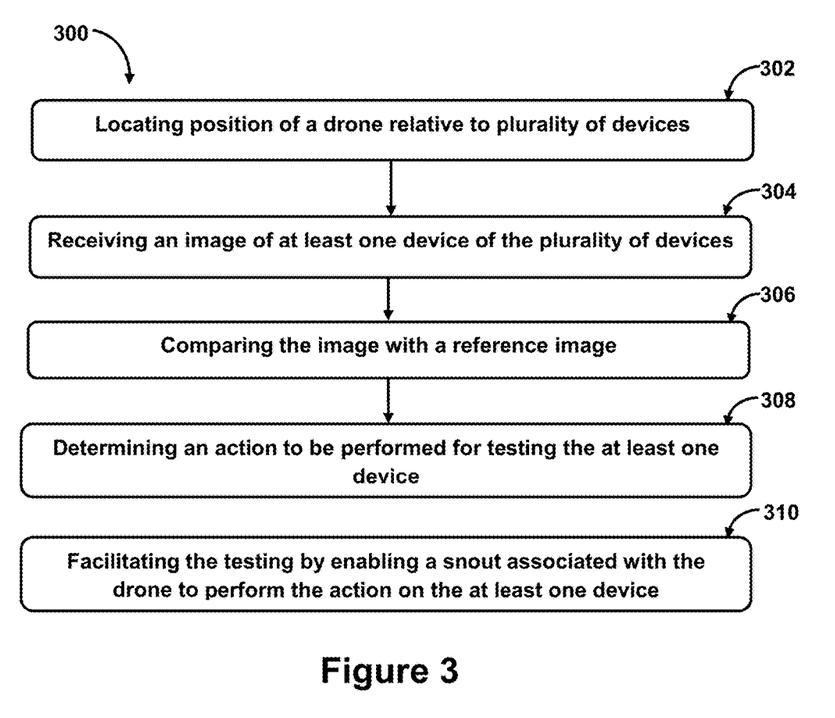
FIG. 3 illustrates a method for facilitating the testing of the plurality of devices using the drone, in accordance with an embodiment of the present disclosure.

Referring now to FIG. 3, the method of facilitating testing of a plurality of devices using a drone is shown, in accordance with an embodiment of the present subject matter. The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, position of the drone is located relative to the plurality of devices placed in a testing environment. The drone may be capable of moving around the plurality of devices.

At block 304, an image of at least one device of the plurality of devices may be received from an image capturing unit of the drone.

At block 306, the image received may be compared with a reference image corresponding to the at least one device of the plurality of devices.

At block 308, an action to be performed for testing the at least one device may be determined based on the comparison.

At block 310, the testing is facilitated by enabling a snout associated with the drone to perform the action on the at least one device.

Although implementations for system and method for facilitating testing of a plurality of devices using a drone have been described in language specific to structural features and/or methods, it is to be understood that the appended claims are not necessarily limited to the specific features or methods described. Rather, the specific features and methods are disclosed as examples of implementations for facilitating testing of a plurality of devices using a drone. Any and all such equivalent embodiments and examples are within the scope of the present invention and are intended to be covered by the appended claims.

We claim:

1. A method for facilitating testing of a plurality of devices using a drone, the method comprising:
    locating, by a processor, a position of the drone relative to the plurality of devices placed in a testing environment, wherein the drone is capable of moving around the plurality of devices;
    receiving, by the processor, an image of at least one device of the plurality of devices, wherein the image is received from an image capturing unit of the drone;
    comparing, by the processor, the image with a reference image corresponding to the at least one device of the plurality of devices;
    determining, by the processor, an action to be performed for testing the at least one device based on the comparison; and
    facilitating the testing by enabling a snout associated with the drone to perform the action on the at least one device.

2. The method of claim 1, further comprises providing continuous power to the drone, wherein the power is provided by a wired means or wireless means.

3. The method of claim 1, further comprises recording activities associated with the testing of the plurality of devices for future references.

4. The method of claim 1, wherein the action to be performed for testing is at least one of touch, click, swipe, knob rotation, hard key press, pressing buttons, or any combination thereof.

5. A system for facilitating testing of a plurality of devices using a drone, wherein the system comprises:
    a processor; and
    a memory coupled to the processor, wherein the processor executes a set of instructions stored in the memory to:

locate a position of a drone relative to a plurality of devices placed in a testing environment, wherein the drone is capable of moving around the plurality of devices;

receive an image of at least one device of the plurality of devices, wherein the image is received from an image capturing unit of the drone;

compare the image with a reference image corresponding to the at least one device of the plurality of devices;

determine an action to be performed for testing the at least one device based on the comparison; and facilitate the testing by enabling a snout associated with the drone to perform the action on the at least one device.

6. The system of claim 5, further comprises providing continuous power to the drone, wherein the power is provided by a wired means or wireless means.

7. The system of claim 5, further comprises recording activities associated with the testing of the plurality of devices for future references.

8. The system of claim 5, wherein the action to be performed for testing is at least one of touch, click, swipe, knob rotation, hard key press, pressing buttons, or any combination thereof.

9. A non-transitory computer readable medium embodying a program executable in a computing device for facilitating testing of a plurality of devices using a drone, the program comprising:

a program code for locating a position of a drone relative to a plurality of devices placed in a testing environment, wherein the drone is capable of moving around the plurality of devices;

a program code for receiving an image of at least one device of the plurality of devices, wherein the image is received from an image capturing unit of the drone;

a program code for comparing the image with a reference image corresponding to the at least one device of the plurality of devices;

a program code for determining an action to be performed for testing the at least one device based on the comparison; and a program code for facilitating the testing by enabling a snout associated with the drone to perform the action on the at least one device.

* * * * *